(12) United States Patent
Threlfall

(10) Patent No.: US 12,196,363 B2
(45) Date of Patent: Jan. 14, 2025

(54) RAIL WITH FLEXIBLE SNAP-ON ATTACHMENTS

(71) Applicant: John Threlfall, Volcano, HI (US)

(72) Inventor: John Threlfall, Volcano, HI (US)

( * ) Notice: Subject to any disclaimer, the term of this patent is extended or adjusted under 35 U.S.C. 154(b) by 0 days.

(21) Appl. No.: 18/197,089

(22) Filed: May 14, 2023

(65) Prior Publication Data
US 2023/0366507 A1 Nov. 16, 2023

Related U.S. Application Data

(60) Provisional application No. 63/342,091, filed on May 14, 2022.

(51) Int. Cl.
*F16M 13/02* (2006.01)
*F16B 45/00* (2006.01)

(52) U.S. Cl.
CPC ........... *F16M 13/022* (2013.01); *F16B 45/00* (2013.01)

(58) Field of Classification Search
CPC .............................. F16M 13/022; F16B 45/00
See application file for complete search history.

(56) References Cited

U.S. PATENT DOCUMENTS

| | | | | | |
|---|---|---|---|---|---|
| 2,855,170 | A | * | 10/1958 | Spinello | E06C 7/14 |
| | | | | | D25/68 |
| 3,616,631 | A | * | 11/1971 | Quam | A01D 7/06 |
| | | | | | 56/400 |
| 5,551,221 | A | * | 9/1996 | Sund | A01D 41/06 |
| | | | | | 460/122 |
| 6,585,204 | B1 | * | 7/2003 | Haertzen | E06C 7/14 |
| | | | | | 248/211 |
| 9,166,385 | B2 | * | 10/2015 | Newman | F16L 3/22 |
| D989,490 | S | * | 6/2023 | Gagne | D3/328 |

(Continued)

FOREIGN PATENT DOCUMENTS

CA 2638331 A1 * 1/2009 ........... A47F 5/0838

OTHER PUBLICATIONS

Hansgrohe WallStoris Towel Hook sold on amazon.com, first available date: Feb. 23, 2022, https://www.amazon.com/Hansgrohe-WallStoris-1-inch-Modern-27914700/dp/B09RZWK1MS (Year: 2022).*

(Continued)

*Primary Examiner* — Eret C McNichols
*Assistant Examiner* — Ding Y Tan
(74) *Attorney, Agent, or Firm* — Roger A. Jackson

(57) ABSTRACT

Article support system that is adapted to support an article relative to a surface, the system includes a rigid rail and a flexible support arm extension having proximal and distal end portions, the distal end portion is adapted to removably engage the article, the proximal end portion is formed as a box channel having an upper leg, a lower leg, and a web disposed therebetween, each of the upper and lower legs terminating in an upper and lower return respectively such that the upper return, upper leg, web, lower leg, and lower return form a "C" shape cross section. Operationally, to removably engage the support arm extension to the rail, the upper leg, and the upper return are manually placed about a rail primary margin portion and the lower leg and the lower return are manually pushed over a rail secondary margin portion through flexure of the web.

7 Claims, 10 Drawing Sheets

(56) References Cited

U.S. PATENT DOCUMENTS

2008/0272548 A1* 11/2008 Hensley .................... F41J 7/00
                                                              273/406
2021/0085101 A1* 3/2021 Thrush ................... F16M 13/02

OTHER PUBLICATIONS

Sunnersta Happy Coaster card kitchen hook (part No. B01LSLEMO4) sold on amazon.com, first available date: Sep. 8, 2016, https://www.amazon.com/SUNNERSTA-kitchen-hookxFF0C-Hooks-PcsxFF0C/dp/B01LSLEMO4 (Year: 2016).*

Crawford powder coated hanger holder sold on amazon, first available date: Apr. 18, 2015, (hereinafter referred to as "Crawford"). https://www.amazon.com/Crawford-Handy-Hooks-Storage-Steel/dp/B00QXX0242 (Year: 2015).*

Metro catalog for wire shelving accessories dated 2011 (Year: 2011).*

Rosle standard kitchen rail youtube video by Sur La Table dated Aug. 23, 2012 https://www.youtube.com/watch?v=6rNyKzuaTWo (Year: 2012).*

* cited by examiner

RAIL WITH FLEXIBLE SNAP-ON ATTACHMENTS

RELATED APPLICATION

This application claims the benefit of U.S. provisional patent application Ser. No. 63/342,091 filed on May 14, 2022 by John Threlfall of Volcano, Hawaii, U.S.

FIELD OF THE INVENTION

The present invention relates to an article support system and a method associated with the system. More particularly, the system includes a substantially rigid element being the rail, in conjunction with a variety of flexible support arm extensions which will all have one common feature, permitting the rapid attachment or detachment of the flexible support arm extensions from the rail, when employing the associated method.

BACKGROUND OF THE INVENTION

The present invention allows the rapid customization of a hanging, storage, or other system of organization or construction. This can be a built-in feature, or an add-on in any room, closet, cabinet, furniture, vehicle, etc. The preferred one-piece design of the flexible support arm extensions allows for the manufacture of a wide variety of low-cost durable choices at an attractive price point for the consumer. The core components of the invention are: 1) the "rail", which may be of any length, substantially rigid, and of uniform cross-section and 2) the flexible support arm extensions, that will have an opening corresponding to the cross-sectional profile of the rail, and sufficient flexibility to allow it to be snapped onto the rail when using the associated method. The rail will have a cross-section similar to a pill shape, with semi-circular ends and elongated parallel sides. The flexible support arm extensions will have an opening that is the same shape and size as the afore-mentioned cross-section, although with one side mostly missing, thus approximating a "C" shape with a straight vertical and an upper and lower "claw". Although not essential, to employ the preferred method of attaching and detaching, at least one part of the associated flexible support arm extensions will have a graspable component coming from the lower backside of the "C" shape.

With respect to the method of the present invention, the user, holding the graspable component of the support arm extensions, hooks the upper "claw" of the "C" onto the upper curve of the rail and rotates the support arm extensions such that the lower "claw" of the "C" bumps against the lower curve of the rail. At this point, sufficient pressure is applied to bend the flexible back section of the "C" and allow the lower claw to go over the bottom curve of the rail and then snap down again, resulting in a snug fit of the flexible support arm extensions onto the rail. To remove the support arm extensions, the graspable component is pulled outward and upward, thus bending the flexible back of the "C", while dragging the lower claw across the bottom curve of the rack, leading to a sudden release of the flexible support arm extensions from the rail. In normal use, the weight of the flexible support arm extensions, along with any associated load form an article, will pull downward and inward, thus helping to tighten the grip of the support arm extensions onto the rail. Ultimately, at the conclusion of these steps, one or more flexible support arm extensions have been placed where desired on the rail, without the use of any additional tools or hardware, yet maintaining a firm grip on the rail, and now ready for use.

The convex feature of the rail, and the concave feature of the flexible support arm extensions may be combined into one unit of any shape desired, with any number of each feature present, to create a system of rapid construction of a general sort, or as a kit for the rapid assembly of a particular item, such as a chair, table, shelter, etc. The invention may be used in any situation where a simple, rapid method of assembly, and/or disassembly is desired for a plurality of flexible support arm extensions. For example, a handle on the flexible support arm extensions that can be snapped on when desired, and then removed when no longer needed. Likewise, a removable armrest for a chair, or a removable seat-like extension for situations such as parks, sporting arenas and vehicles. The cross-sectional profile of the rail and of the corresponding flexible support arm extensions may be altered, so as to optimize performance characteristics in different circumstances, for example, the profiles can be modified to make it relatively easy to snap on, but harder to snap off.

The preferred embodiment consists of a rail, of a material of sufficient strength and rigidity, such as aluminum, with an oblong cross-section resembling a rectangle with a semi-circle at each end. In conjunction with the rail, are any number and variety of flexible support arm extensions, of any material, such as plastic, that has a degree of elasticity. While the shape and function of each flexible support arm extensions can vary greatly, each one will have a concave opening whose cross-section matches that of the rail, with an opening on one side, which roughly corresponds to one of the sides of the rectangle. The contour of the opening will thus resemble a C-shape, or two semi-circles connected by a straight segment. This C-shaped part of each flexible support arm extensions will have sufficient elasticity to allow it to be forced over and snapped onto the rail, when using the associated method.

The variety of flexible support arm extensions may include, but not be limited to: hooks, hangers, light fixtures, shelves, bottle holders, vases, mirrors, and so on. Part of each flexible support arm extensions will extend from the lower portion of the C-shaped part, in a manner that will allow it to be grasped by the user. This will facilitate the preferred method of coupling and uncoupling the flexible support arm extensions from the rail, to couple the support arm extensions to the rail, the user grasps the lower extending feature and hooks the lower part of the concave opening onto the matching lower curve of the rail.

Currently there are a number of solutions for the need to create a rapid, expandable, customizable and economical, hanging, storage, or organizational apparatus/system. Some of these solutions attempt to solve the problem by means of rails, or tracks, where multiple hangers may be clipped onto the track, or placed on the track by means of sliding onto it from one end. These solutions fail to meet the needs of the industry because they are bulky, time consuming to re-arrange, loose or wobbly, or costly to manufacture. Other solutions attempt to achieve ease of assembly and rearrangement, as well as a secure grip on the rail, but these solutions are similarly unable to meet the needs of the industry, because they require mechanisms with multiple parts and therefore are bulky, vulnerable to mechanical malfunction, and expensive to manufacture.

The present invention is unique in that it is structurally different from other known devices or solutions. More specifically the presentation invention is unique in that it utilizes the principle of elasticity, in combination with an advantageous matching cross-sectional profile in both the rail and flexible support arm extensions, to achieve in a one piece design, a structural malleability that allows the support arm extensions to be attached or detached easily and swiftly from the rail, while also maintaining a tight grip on the rail when in use.

In looking at the prior art in this area, in U.S. Pat. No. 3,593,468 to Bustin, discloses an interlocking channel section for walls, ceilings, and floors, utilizing an interlocking snap channel with "U" shaped termination of the sidewall end pieces. Note that in Bustin these are permanent assemblies as opposed to the present invention being removably engageable assemblies.

Next, in the prior art in U.S. Pat. No. 4,995,323 to Kellems, discloses a modular shelving and hanger bar system that has a "C" shaped shelf with planks that are flexible having an inwardly directed lip to elastically engage the recessed channel of the raised boss.

Further, in the prior art in U.S. Pat. No. 6,733,595 to Grillo, discloses a snap collar wall hanger that has a "C" receptacle for removably holding a broom handle type of element on a foot brush assembly, however, having the tip extensions of the "C" flex outwards and the web of the "C" section being relatively stiffer which is opposite of the present invention, further, Grillo has no clamp tightening with added load as the present invention does.

Continuing, in the prior art in U.S. Pat. No. 11,460,173 to Brooks, discloses a snap rail arrangement for PC circuit boards, that has a "C" shaped channel that is flexible, see in particular FIGS. 14 and 15, that shows the snap-fit manner of the rail for the PC boards that are mounted in a row adjacent to one another.

In addition, in the prior art in United States Patent Application Publication Number US 2003/0089823 to Korczak, discloses a channel snap that uses an anchor rail shaped like a "U" shaped channel with a snap-in adaptor having flanges that engage a rail lip, wherein the adaptor is of a flexible construction that supports an article to be suspended from.

Next, in the prior art in United States Patent Application Publication Number US2018/0316300 (matured into U.S. Pat. No. 10,177,704) to Kapla, discloses a snap rail for solar panel mounting frames that has a flat spring loaded removably engageable retainer, see FIG. 6A, for making the solar panels serviceable.

What is needed is a rail with flexible support arm extensions and that it would be desirable to have a hook and rail system that is simple and customizable, allowing the rapid placement or removal of compatible support arm extensions to or from the rail. Furthermore, it would be desirable to have support arm extensions and rail system with a variety of different attachable support arm extensions s, that are of simple design and cheap to manufacture, yet strong and capable of sustaining a heavy load.

Still further, it would be desirable to have a customizable support arm extensions and rail system, where the attachments can be swiftly arranged and rearranged without needing to move the other support arm extensions first (such as by sliding everything off a rail). Further, still, it would be desirable for each support arm extensions, once placed, to hold firmly, without wobbling or sliding in relation to the rail. Therefore, there currently exists a need in the industry, for a support arm extensions and rail system that is cheap, quickly customizable, and offering a wide variety of one-piece support arm extensions which snap on and off easily, grip firmly when attached, and are robust enough to support significant weight from the rail.

The present invention is unique when compared with other known devices and solutions because it provides attachable support arm extensions that are of a flexible one-piece design, which are able to achieve desirable functional qualities, that would otherwise require a more complex, or cumbersome, or heavier mechanism. Among these qualities are the great ease and speed of attaching and detaching the support arm extensions from the rail, the firm grip of the support arm extensions to the rail when attached, and the tendency for the grip to strengthen as load is applied to the support arm extensions.

Similarly, the associated method is unique when compared with other known solutions, in that it provides a fast, non-stressful, intuitive and pleasing method of attaching and detaching the support arm extensions from the rail. Similarly, the method provides unique, visual, auditory, and proprioceptive feedback to the user, which is congruent and indicative of each stage of movement, engagement, and structural alteration of the support arm extensions as they are coupled or uncoupled from the rail.

SUMMARY OF INVENTION

Broadly, the present invention is the article support system that is adapted to support an article upon and relative to a wall surface, wherein the article is suspended above a floor surface that includes the substantially rigid rail structure that includes a rail first end portion and an opposing rail second end portion with a longitudinal axis spanning therebetween. Further the rail structure has a primary margin portion and an opposing secondary margin portion with a longwise axis spanning therebetween, wherein the primary and secondary margin portions are about the longitudinal axis, in addition the rail structure includes a first outer surface portion and an opposing second outer surface portion, with a shortwise axis spanning therebetween. Wherein the first and second outer surface portions are about the longitudinal axis, wherein the second outer surface is adapted to affix to the wall surface, wherein the primary and secondary margins are structurally formed as a convex semi-circular radius surface that has a tangent interface with each of the first and second outer surface portions, the longitudinal, longwise, and short wise axes are all perpendicular to one another.

Further the article support system includes the flexible support arm extension having a proximal end portion and an opposing distal end portion with an arm axis spanning therebetween, the distal end portion is adapted to removably engage the article, the proximal end portion is structurally substantially formed as a box channel having an upper leg, a lower leg, and a web disposed therebetween, each of the upper and lower legs terminating in an upper and lower return respectively such that the upper return, upper leg, web, lower leg, and lower return substantially form a "C" shape in cross section. Wherein operationally to removably engage the support arm extension to the rail structure, the upper leg and the upper return are manually placed about the primary margin portion and the lower leg and the lower return are manually pushed over the secondary margin portion through flexure of the web in conjunction with the upper and lower legs to position said substantially "C" shape about the rail structure primary and secondary margin portions and the first outer surface portion then manually relaxing the upper and lower legs and the web that results in the upper and lower legs, the upper and lower returns, and the web to adjacently grip the rail structure primary and secondary margin portions and the first outer surface portion to secure the support arm extension to the rail structure via locking the support arm extension in movement along the longitudinal, longwise, shortwise, and arm axes relative to the rail structure.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 2 shows a close-up view of a single flexible support arm extension and the rail structure of FIG. 1, wherein FIG. 2 shows the upper perspective view of the article support system that includes the rail structure, and the flexible support arm extension;

FIG. 3 shows view 3-3 from FIG. 2, wherein FIG. 3 shows the detail of the interface of the flexible support arm proximal end portion "C" shaped cross section to the rail structure in the assembled operational state;

REFERENCE NUMBERS IN DRAWINGS

Figure 6:
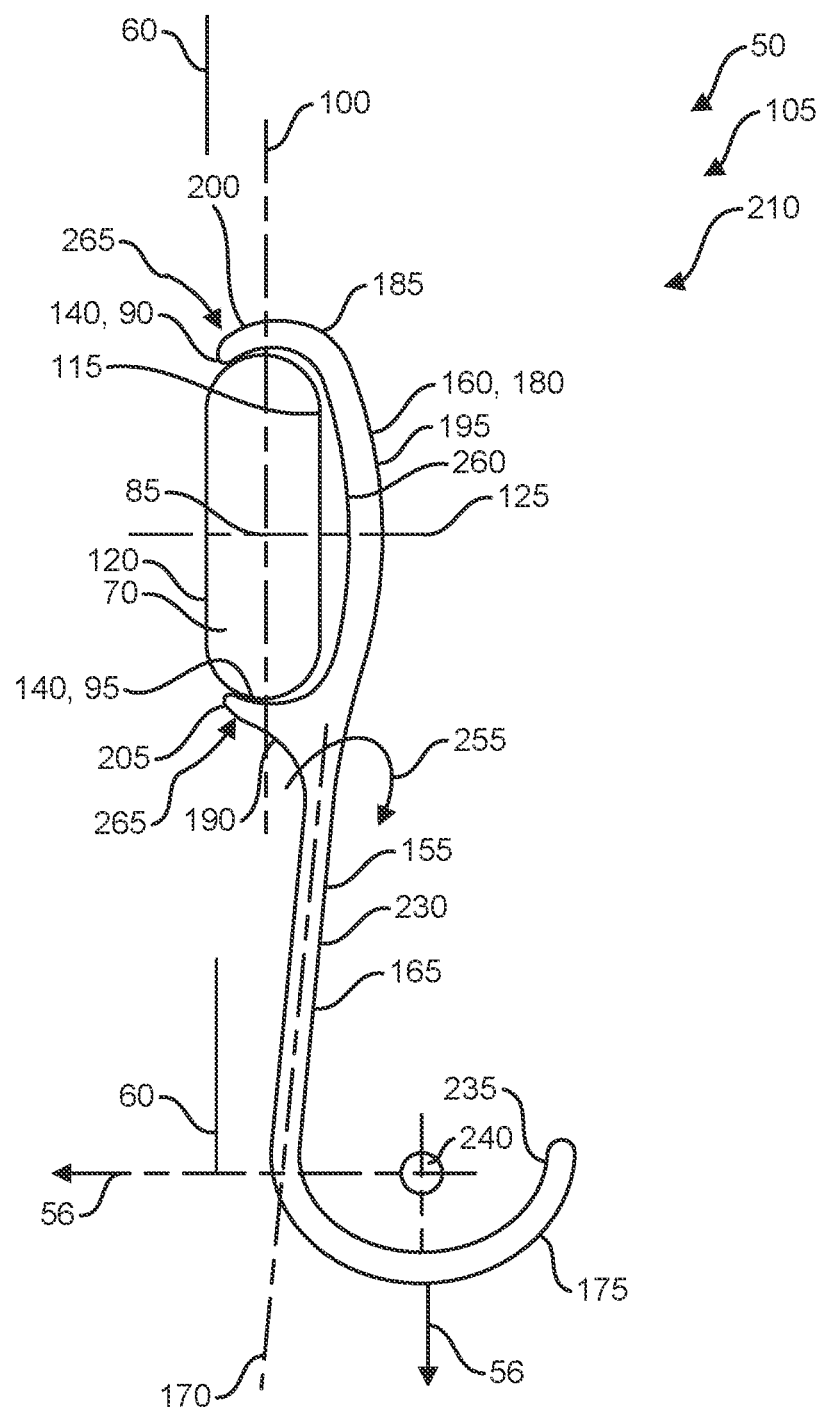
FIG. 6 also originates from FIG. 3, wherein the finger extension portion terminates in the open "J" hook that is positioned opposite of the upper and lower legs relative to the web and the arm axis, wherein the open "J" hook has a center of gravity from the weight of the article that is the first distance from the arm axis, wherein the first distance forms the first moment from the first moment arm from the article weight to bow the web into a concave arc away from the rail structure first outer surface that results in the upper and lower legs that terminate in the upper and lower returns respectively having force to be moved closer to one another, resulting in a tighter grip of the upper and lower legs and respective returns upon the rail structure primary and secondary margins.

50 Article Support System
55 Article that can be in the form of a coat, jacket, scarf, belt, shirt, tools, utensils, extension cords, and the like
56 Weight or force of the article 55 that can be parallel to the longwise axis 100 or parallel to the shortwise axis 125
60 Wall or other support surface or a seat surface that would facilitate article 55 weight 56 to be in two directions ninety degrees apart from one another, see FIG. 6
61 Suspended nature of the article 55 over and above the floor surface 65
65 Floor surface
70 Substantially rigid rail structure
75 First end portion of the rail structure 70
80 Second end portion of the rail structure 70
85 Longitudinal axis of the rail structure 70
90 Primary margin portion of the rail structure 70
95 Secondary margin portion of the rail structure 70
100 Longwise axis of the rail structure 70
105 Assembled operational state of the rail structure 70 and the support arm extension 155
106 Disassembled operational state of the rail structure 70 and the support arm extension 155
110 Primary 90 and secondary 95 margin portions being about the longitudinal axis 85
115 First outer surface of the rail structure 70
120 Second outer surface of the rail structure 70
125 Shortwise axis of the rail structure 70
130 First 115 and second 120 outer surfaces being about the longitudinal axis 85
135 Second outer surface being adapted to affix to the vertical wall surface 60
140 Convex semi-circular radius surface of the primary 90 and secondary 95 margins
145 Tangent interface of the primary 90 and secondary 95 margins to the first 115 and second 120 outer surface portions
150 Perpendicular position of the longitudinal 85, longwise 100, and shortwise 125 axes to one another
155 Flexible support arm extension
156 Channel support arm extension
157 Tubular support arm extension 160 Proximal end portion of the support arm extension 155, the channel support arm extension 156, and the tubular support arm extension 157, the channel support arm extension 156, and the tubular support arm extension 157
165 Distal end portion of the support arm extension 155, the channel support arm extension 156, and the tubular support arm extension 157
170 Arm axis
171 Tubular axis
175 Distal end portion 165 being adapted to removably engage the article 55
180 Box channel of the proximal end portion 160
181 Box channel of the proximal end portion 160 of the tubular support arm extension 157
185 Upper leg of the box channel 180
186 Upper leg of the box channel 180 of the tubular support arm extension 157
190 Lower leg of the box channel 180
191 Lower leg of the box channel 180 of the tubular support arm extension 157
195 Web of the box channel 180
196 Web of the box channel 180 of the tubular support arm extension 157
200 Upper return of the box channel 180
201 Upper return of the box channel 180 of the tubular support arm extension 157
205 Lower return of the box channel 180
206 Lower return of the box channel 180 of the tubular support arm extension 157
210 Substantially "C" shape cross section formed from the upper return 200, 201, upper leg 185, 186, web 195, 196, lower leg 190, 191, and lower return 205, 206
215 Manually spreading apart the lower 190 leg
220 Positioning the "C" shape 210 about the rail structure 70 primary 90 and secondary 95 margin portions and the first outer surface 115
221 Moving the flexible support arm extension 155 toward the rail structure 70
225 Manually relaxing the upper 185 and lower 190 legs to allow the upper return 200, the upper leg 185, the web 195, the lower leg 190, and the lower return 205 to adjacently grip the rail structure 70 primary 90 and secondary 95 margin portions and the first outer surface 115 to secure the support arm extension 155 to the rail structure 70 thus locking the support arm extension 155 from movement in the longitudinal 85, longwise 100, shortwise 125, arm 170 axes
230 Finger extension portion
231 Channel finger extension portion that tapers from the lower return 205 to the distal end portion 165
232 Channel web
233 Channel legs
234 Taper of the channel legs 233
235 Open "J" hook
236 Tubular finger extension portion
240 Center of gravity of the open "J" hook
245 First distance
246 First distance of the tubular support arm extension 157
250 First moment arm
255 First moment
260 Bow of the web 195 into a concave arc away from the rail structure 70 first outer surface 115
265 Force from the first moment 255 to move the upper 200 and lower 205 returns toward one another to have a tighter grip of the upper 185 and lower 190 legs and upper 200 and lower 205 returns upon the rail structure 70 primary 90 and secondary 95 margins to better resist the heavy 56 article 55 dislodging the support arm structure 155 from the rail structure 70
270 Second distance
271 Second distance 270 along the arm axis 170
275 Second moment
280 Second moment arm
285 Manual grasping of the open "J" hook 235
290 Manual force movement pulling of the open "J" hook 235 away from the web 195 and the first outer surface 115
295 Movement 290 parallel to the shortwise axis 125
300 Bow of the web 195 into a convex arc away from the rail structure 70 first outer surface 115
305 Movement of the lower leg 190 and lower 205 return from the secondary margin portion 95 resulting in a looser grip creating a gap 310 to manually dislodge the support arm extension 155 from the rail structure 70
310 Gap as between the lower leg 190 and the lower return 205 relative to the rail structure 70 secondary margin portion 95

DETAILED DESCRIPTION

Figure 1:
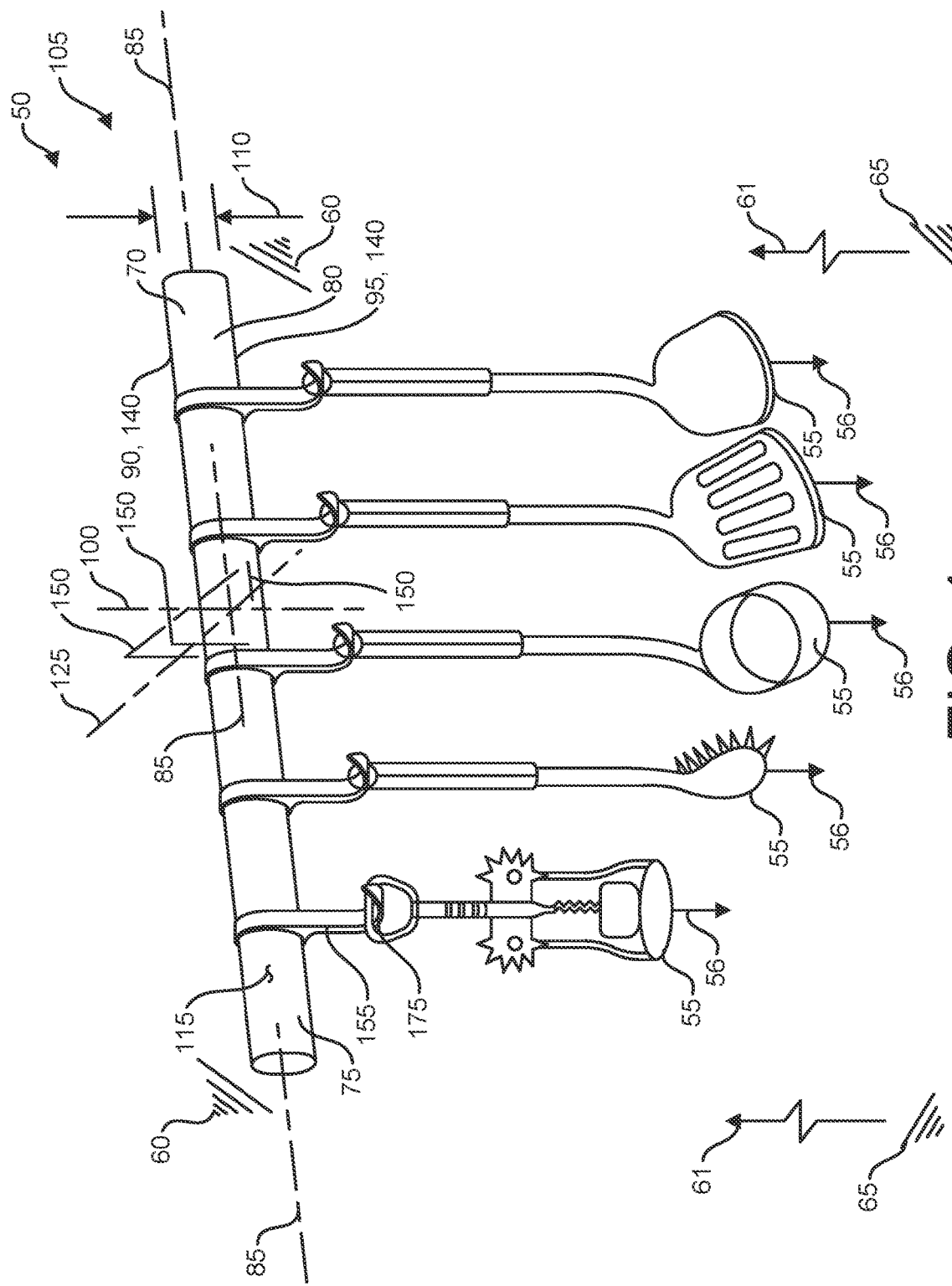
FIG. 1 shows an upper perspective view of the article support system that includes the rail structure, and the flexible support arm extension, wherein the flexible support arm extension removably engages the article to support the article, with the rail structure affixed to the wall.

With initial reference to FIG. 1 shown is an upper perspective view of the article support system 50 that includes the rail structure 70, and the flexible support arm extension 155, wherein the flexible support arm extension 155 removably engages the article 55 to support 61 the article 55, with the rail structure 70 affixed 135 to the wall 60.

Figure 2:
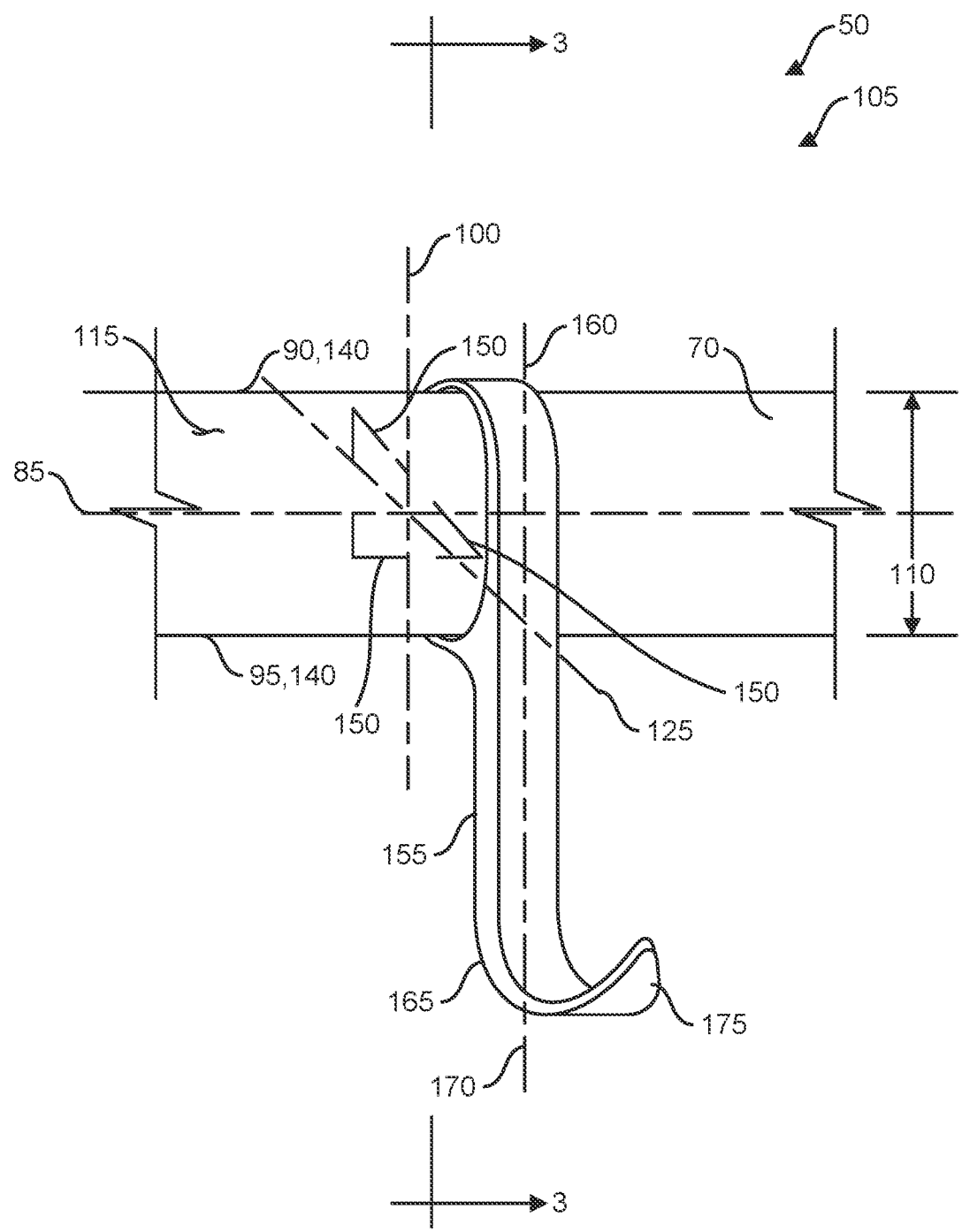

Next, FIG. 2 shows a close-up view of a single flexible support arm extension 155 and the rail structure 70 of FIG. 1, wherein FIG. 2 shows the upper perspective view of the article support system 50 that includes the rail structure 70, and the flexible support arm extension 155.

Figure 3:
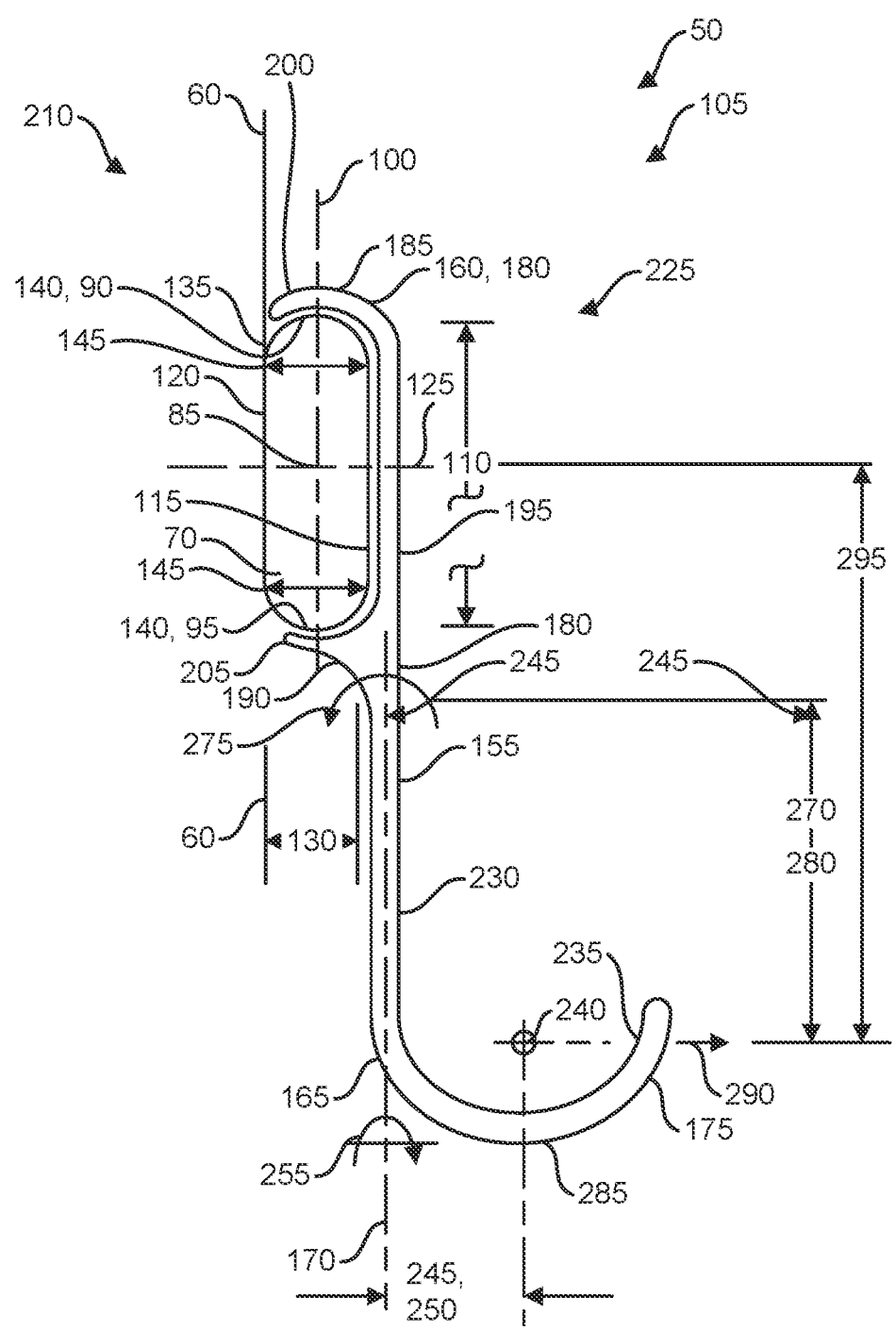

Further, FIG. 3 shows view 3-3 from FIG. 2, wherein FIG. 3 shows the detail of the interface of the flexible support arm 155 proximal end portion 160 "C" shaped cross section 210 to the rail structure 70 in the assembled operational state 105.

Figure 4:
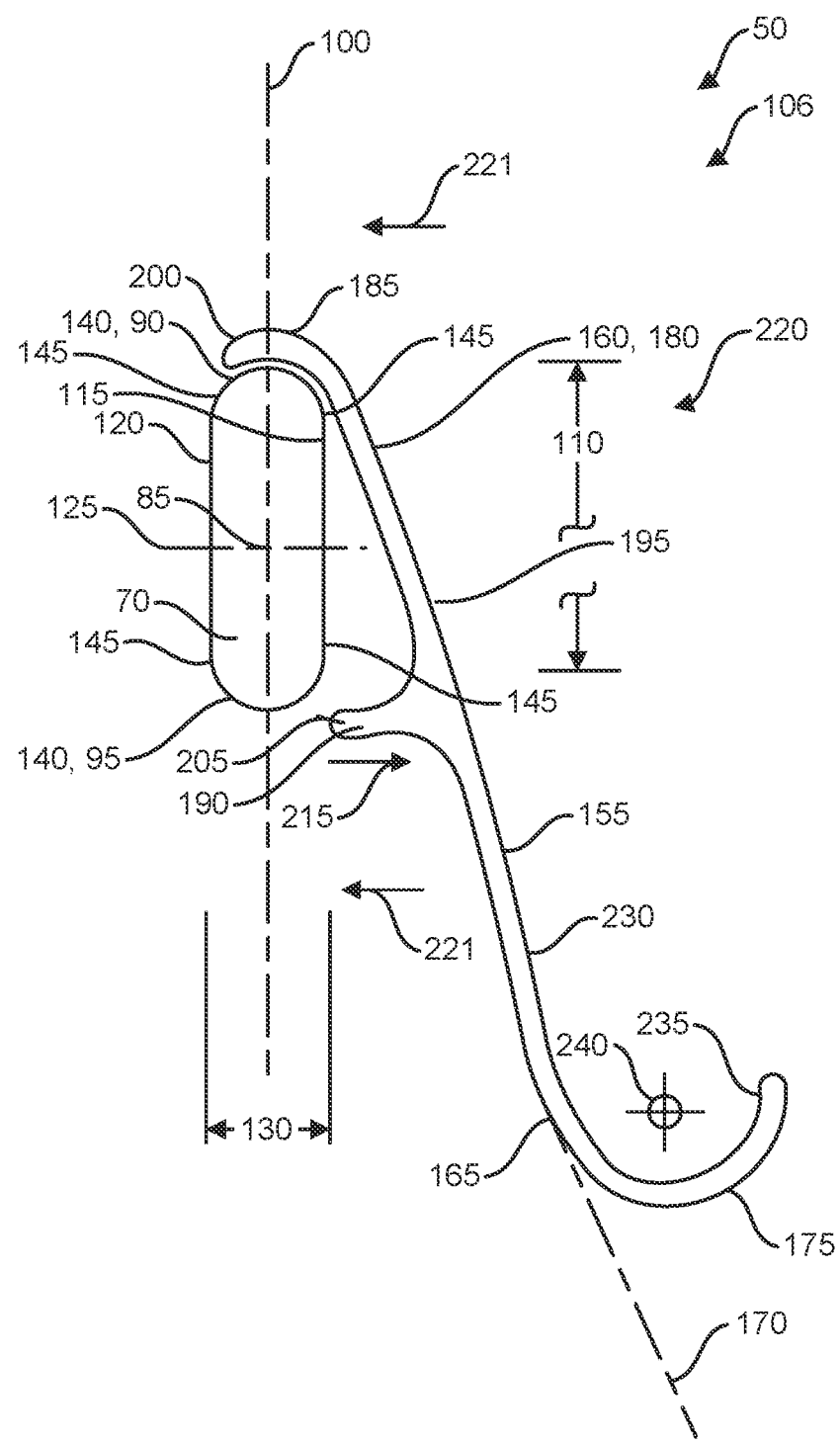
FIG. 4 originates from FIG. 3, however, showing the operation to removably engage the support arm extension to the rail structure, wherein the upper leg and said upper return are manually placed about the primary margin portion and the lower leg and the lower return are manually pushed over toward the secondary margin portion.

Continuing, FIG. 4 originates from FIG. 3, however, showing the operation to removably engage the support arm extension 155 to the rail structure 70, wherein the upper leg 185 and said upper return 200 are manually placed about the primary margin portion 90 and the lower leg 190 and the lower return 205 are manually pushed over toward the secondary margin portion 95.

Figure 5:
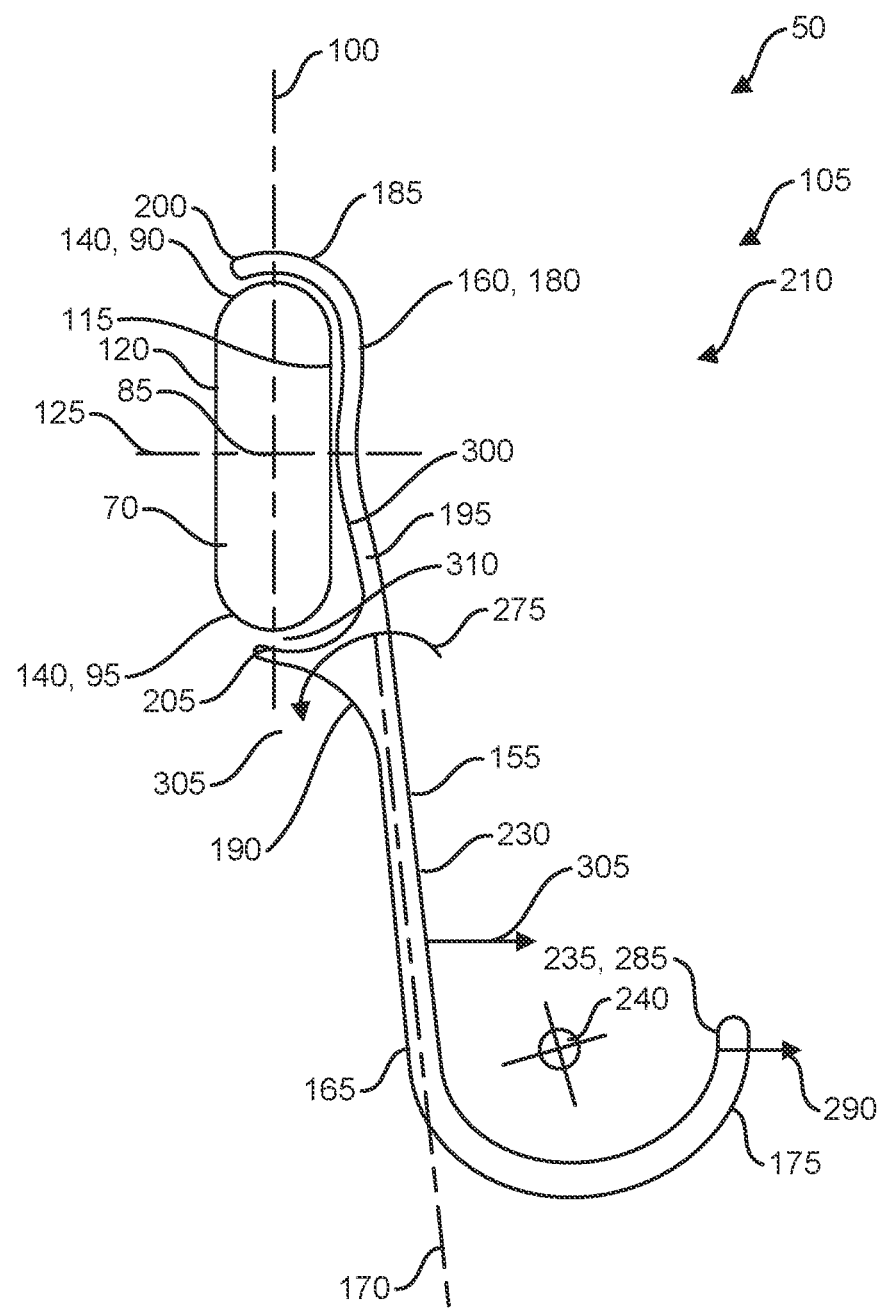
FIG. 5 also originates from FIG. 3, however, showing the operation to removably disengage the support arm extension to the rail structure, by manually pulling the distal end portion away from the web and the first outer surface in a movement parallel to the shortwise axis, wherein the second moment from the second moment arm to bow the web into a convex arc away from the rail structure first outer surface that results in the lower leg and lower return to be moved further from the secondary margin portion resulting in a looser grip creating a gap of the lower leg and lower return relative to the rail structure secondary margin portion to better allow dislodging of the support arm extension from said rail structure.

Moving onward, FIG. 5 also originates from FIG. 3, however, showing the operation to removably disengage the support arm extension 155 to the rail structure 70, by manually pulling 290 the distal end portion 165 away from the web 195 and the first outer surface 115 in a movement parallel 295 to the shortwise axis 125, wherein the second moment 275 from the second moment arm 280 to bow the web 195 into a convex arc 300 away from the rail structure 70 first outer surface 115 that results in the lower leg 190 and lower return 205 to be moved further from the secondary margin portion 95 resulting in a looser grip creating a gap 310 of the lower leg 190 and lower return 205 relative to the rail structure 70 secondary margin portion 95 to better allow dislodging 106 of the support arm extension 155 from the rail structure 70.

Further, FIG. 6 also originates from FIG. 3, wherein the finger extension portion 230 terminates in the open "J" hook 235 that is positioned opposite of the upper 185 and 190 lower legs relative to the web 195 and the arm axis 170, wherein the open "J" hook 235 has a center of gravity 240 from the weight 56 of the article 55 that is the first distance 245 from the arm axis 170, wherein the first distance 245 forms the first moment 255 from the first moment arm 250 from the article 55 weight 56 to bow the web 195 into a concave arc 260 away from the rail structure 70 first outer surface 115 that results in the upper 185 and lower 190 legs that terminate in the upper 200 and lower 205 returns respectively having force 265 to be moved closer to one another, resulting in a tighter grip of the upper 185 and lower 190 legs and respective returns 200, 205 upon the rail structure 70 primary 90 and secondary 95 margins.

Figure 7:
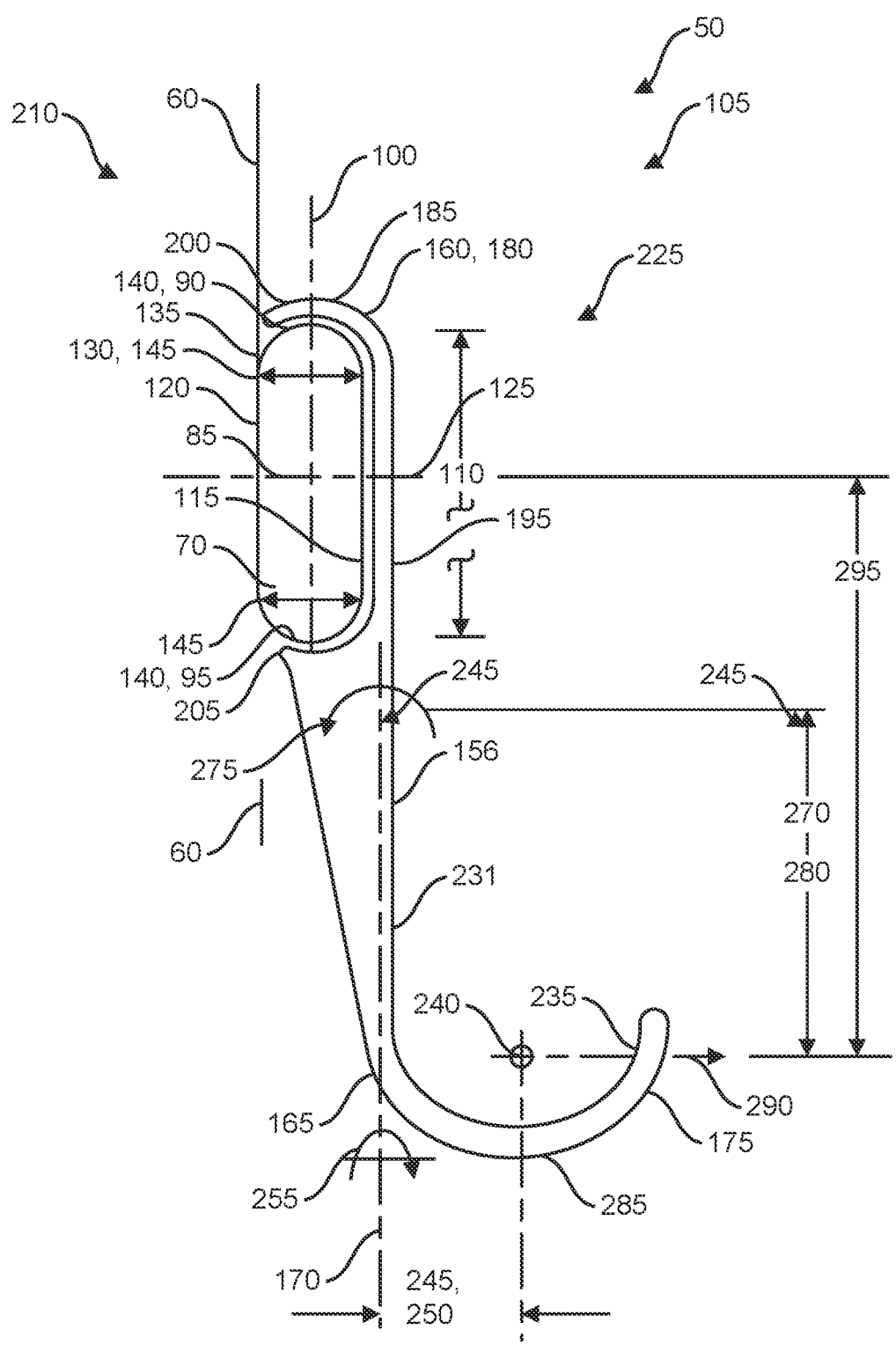
FIG. 7 shows a side elevation view the finger extension portion that is constructed of a tapered channel that includes the channel web with a pair of opposing tapered channel legs, wherein the channel legs taper from the full width taper at the lower return to a reduced width taper with at the support arm extension distal end portion.

Also, FIG. 7 shows a side elevation view the finger extension portion 230 that is constructed of a tapered 234 channel 231 that includes the channel web 232 with a pair of opposing tapered 234 channel legs 233, wherein the channel 231 legs 233 taper 234 from the full width taper 234 at the lower return 205 to a reduced width taper 234 with at the support arm extension 155 distal end portion 165.

Figure 8:
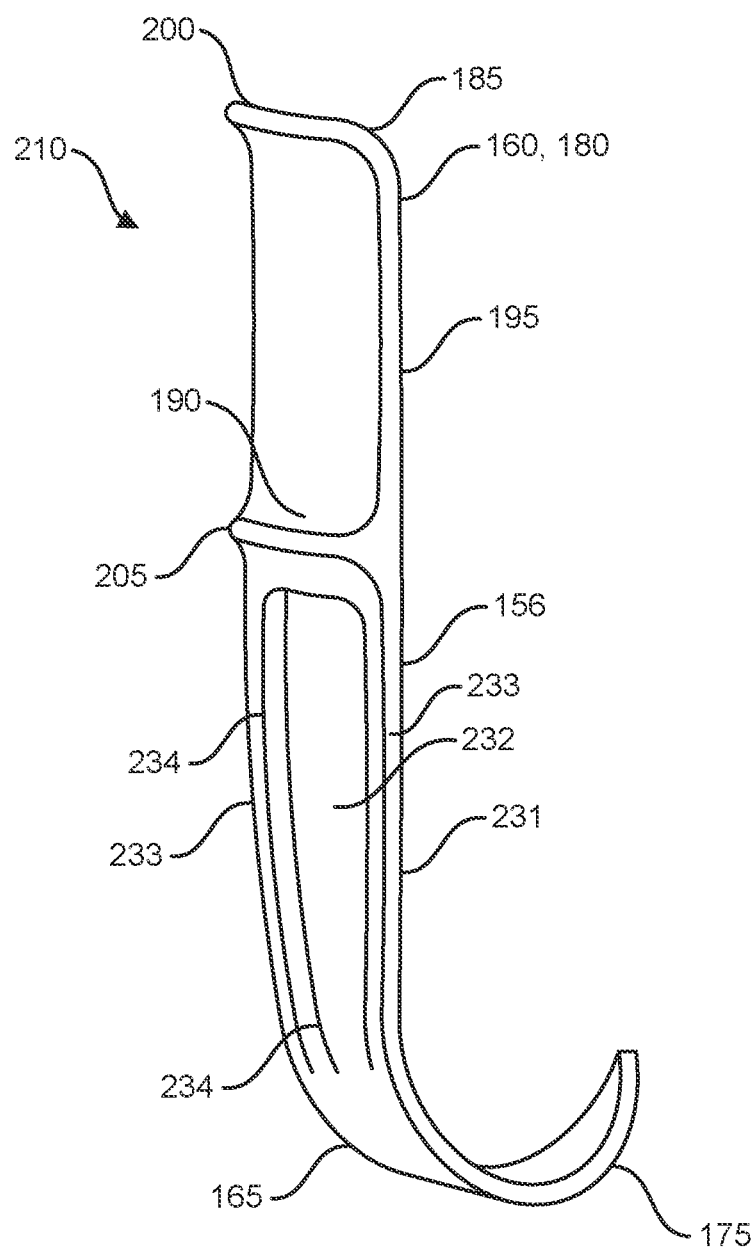
FIG. 8 shows an upper perspective view the finger extension portion that is constructed of a tapered channel that includes the channel web with a pair of opposing tapered channel legs, wherein the channel legs taper from the full width taper at the lower return to a reduced width taper with at the support arm extension distal end portion.

In addition, FIG. 8 shows an upper perspective view the finger extension portion 230 that is constructed of a tapered 234 channel 231 that includes the channel web 232 with a pair of opposing tapered 234 channel 231 legs 233, wherein the channel 231 legs 233 taper 234 from the full width taper 2343 at the lower return 205 to a reduced width taper 234 with at the support arm extension 155 distal end portion 165.

Figure 9:
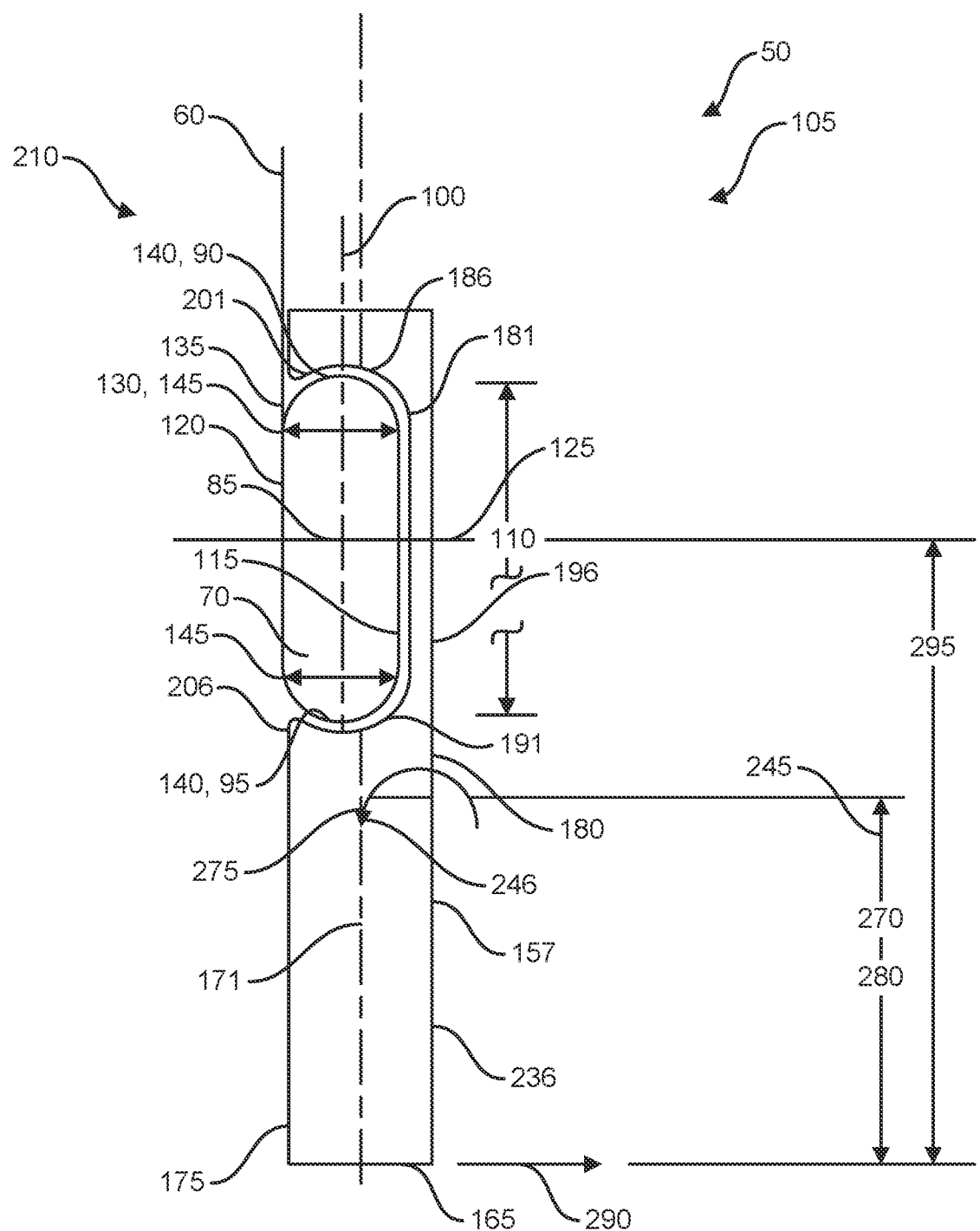
FIG. 9 shows a side elevation view of the support arm extension that is constructed of a tubular section with the tubular axis, wherein the distal end portion is adapted to removably engage the article, and the proximal end portion is structurally formed as a tubular box channel having a tubular upper leg, a tubular lower leg, and a tubular web disposed therebetween to form a scarfed out "C" shape in cross section that is scarfed out of a portion of the tubular section.

Next, FIG. 9 shows a side elevation view of the support arm extension 155 that is constructed of a tubular section 157 with the tubular axis 171, wherein the distal end portion 165 is adapted to removably engage 175 the article 55, and the proximal end portion 160 is structurally formed as a tubular 157 box channel 181 having a tubular upper leg 186, a tubular lower leg 191, and a tubular web 196 disposed therebetween to form a scarfed out "C" shape 210 in cross section that is scarfed out of a portion of the tubular section 157.

Figure 10:
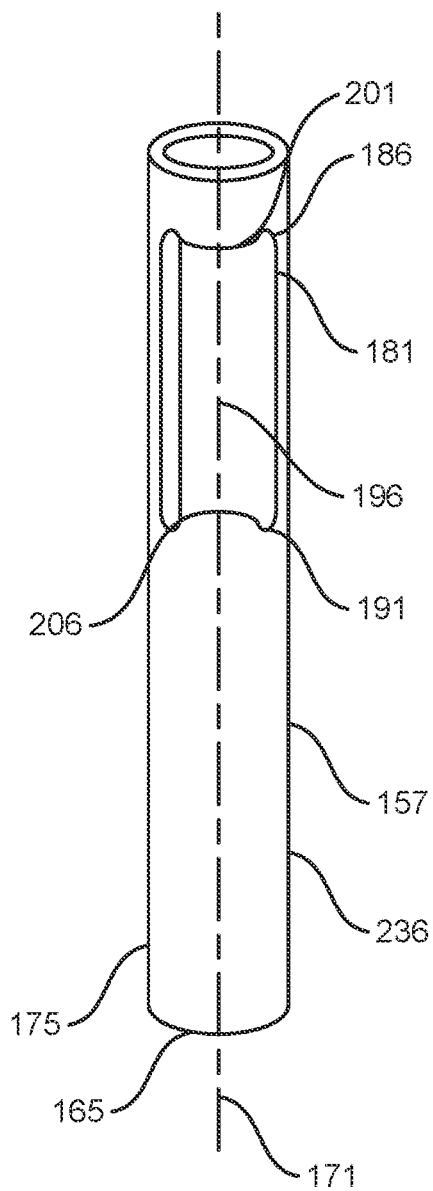
FIG. 10 shows an upper perspective view of the support arm extension that is constructed of a tubular section with the tubular axis, wherein the distal end portion is adapted to removably engage the article, and the proximal end portion is structurally formed as a tubular box channel having a tubular upper leg, a tubular lower leg, and a tubular web disposed therebetween to form a scarfed out "C" shape in cross section that is scarfed out of a portion of the tubular section.

Further, FIG. 10 shows an upper perspective view of the support arm extension 155 that is constructed of a tubular section 157 with the tubular axis 171, wherein the distal end portion 165 is adapted to removably engage 175 the article 55, and the proximal end portion 160 is structurally formed as a tubular 157 box channel 181 having a tubular upper leg 186, a tubular lower leg 191, and a tubular web 196 disposed therebetween to form a scarfed out "C" shape 210 in cross section that is scarfed out of a portion of the tubular section 157.

Broadly, in looking at FIGS. 1 to 10, the present invention is the article support system 50 that is adapted to support an article 55 upon and relative to a surface 60, wherein the article 55 is suspended 61 above a floor surface 65 that includes the substantially rigid rail structure 70 that includes a rail first end portion 75 and an opposing rail second end portion 80 with a longitudinal axis 85 spanning therebetween. Further the rail structure 70 has a primary margin portion 90 and an opposing secondary margin portion 95 with a longwise axis 100 spanning therebetween, wherein the primary 90 and secondary 95 margin portions are about the longitudinal axis 85. In addition the rail structure 70 includes a first outer surface portion 115 and an opposing second outer surface portion 120, with a shortwise axis 125 spanning therebetween, wherein the first 115 and second 120 outer surface portions are about the longitudinal axis 85, wherein the second outer surface 120 is adapted to affix 135 to the wall surface 60, wherein the primary 90 and secondary 95 margins are structurally formed as a convex semi-circular radius surface 140 that has a tangent interface 145 with each of the first 115 and second 120 outer surface portions, the longitudinal 85, longwise 100, and short wise 125 axes are all perpendicular 150 to one another.

Also included in the article support system 50 is the flexible support arm extension 155 having a proximal end portion 160 and an opposing distal end portion 165 with an arm axis 170 spanning therebetween, the distal end portion 165 is adapted 175 to removably engage the article 55, the proximal end portion 160 is structurally substantially formed as a box channel 180 having the upper leg 185, the lower leg 190, and the web 195 disposed therebetween, each of the upper 185 and lower 190 legs terminating in the upper 200 and lower 205 return respectively such that the upper return 200, upper leg 185, web 195, lower leg 190, and lower return 205 substantially form a "C" shape 210 in cross section. Wherein operationally, to removably engage 106 the support arm extension 155 from the rail structure 70, the upper leg 185 and the upper return 200 are manually placed about the primary margin portion 90 and the lower leg 190 and the lower return 205 are manually pushed 221 over the secondary margin portion 95 through flexure of the web 195 in conjunction with the upper 185 and lower 190 legs to position the substantially "C" shape 210 about the rail structure 70 primary 90 and secondary 95 margin portions and the first outer surface portion 115 then manually relaxing the upper 185 and lower 190 legs and the web 195 that results in the upper 185 and lower 190 legs, the upper 200 and lower 205 returns, and the web 195 to adjacently grip the rail structure 70 primary 90 and secondary 95 margin portions and the first outer surface portion 115 to secure the support arm extension 155 to the rail structure 70 via locking the support arm extension 155 in movement along the longitudinal 85, longwise 100, shortwise 125, and arm 170 axes relative to the rail structure 70, see FIGS. 1 to 6.

As an option for the article support system 50, is where the support arm extension 155 distal end portion 165 that is adapted 175 to removably engage the article 55, can be constructed of a finger extension portion 230 extending downward from the web 195 and the lower leg 190 in a cantilever manner along the arm axis 170, wherein the finger extension portion 230 terminates in an open "J" hook 235 that is positioned opposite of the upper 185 and lower 190 legs relative to the web 195 and the arm axis 170. Wherein the open "J" hook 235 has a center of gravity 240 from a weight 56 of the article 55 that is a first distance 245 from the arm axis 170, wherein the first distance 245 forms a first moment 255 from a first moment arm 250 from the article 55 weight 56 to bow the web 195 into a concave arc 260 away from the rail structure 70 first outer surface 115 that results in the upper 185 and lower 190 legs that terminate in the upper 200 and lower 205 returns respectively having force 265 to be moved closer to one another, resulting in a tighter grip of the upper 185 and lower 190 legs and respective returns 200, 205 upon the rail structure 70 primary 90 and secondary 95 margins portions to better resist a heavy article 55 from dislodging from the support arm extension 155 from the rail structure 70, see in particular FIG. 6.

Another option for the article support system 50, is wherein the finger extension portion 230 material has a higher bending stiffness than the web 195 material bending stiffness to better operationally control that the first distance 245 first moment 255 from the first moment arm 250 translates through the finger extension portion 230 with minimal deflection moving toward the web 195 with maximum deflection to form the concave web arc 260.

Continuing on options for the article support system 50, wherein the support arm extension 155 distal end portion 165 that is adapted to removably engage 175 the article 55, is constructed of the finger extension portion 230 extending downward from the web 195 and the lower leg 190 in a cantilever manner along the arm axis 170, wherein the finger extension portion 230 terminates in an open "J" hook 235 that is positioned a second distance 270 from the web 195 and lower leg 190, wherein the second distance 270 is along the arm axis 170, wherein the second distance 270 forms a second moment 275 from a second moment arm 280 from a manual grasping of the open "J" hook 235 and manually pulling 290 the open "J" hook 235 away from the web 195 and the first outer surface 115 in a movement parallel 295 to said shortwise axis 125, wherein the second moment 275 from the second moment arm 280 to bow the web 195 into a convex arc 300 away from the rail structure 70 first outer surface 115 that results in the lower leg 190 and lower returns 205 to be moved further from the secondary margin portion 95 resulting in a looser grip creating a gap 310 of the lower leg 190 and lower return 205 relative to the rail structure 70 secondary margin portion 95 to better allow dislodging of the support arm extension 155 from the rail structure 70, see in particular FIG. 5.

A next option for the article support system 50, is wherein the finger extension portion 230 material has a higher bending stiffness that the web 195 material bending stiffness to better operationally control that the second distance 270 second moment 275 from the second moment arm 280 translates through the finger extension portion 230 with minimal deflection moving toward the web 195 with maximum deflection to form said convex web arc 300.

Another option for the article support system 55, is wherein the support arm extension 155 distal end portion 165 that is adapted to removably engage 175 the article 55, can be constructed of a finger extension portion 230 extending downward from the web 195 and the lower leg 190 in a cantilever manner along the arm axis 170, wherein the finger extension portion 230 is constructed of a tapered 234 channel 231 that includes a tapered 234 channel web 232 with a pair of opposing tapered 234 channel legs 233, wherein the channel 231 legs 233 taper 234 from the a full width taper 234 at the lower return 205 to a reduced width taper 234 with at the support arm extension 155 distal end portion 175. Wherein the finger extension portion 230 terminates in the open "J" hook 235 that is positioned opposite of the upper 185 and lower 190 legs relative to the web 195 and the arm axis 170, wherein the open "J" hook 235 has a center of gravity 240 from a weight 56 of the article 55 that is the first distance 245 from the arm axis 170, wherein the first distance 245 forms the first moment 255 from the first moment arm 250 from the article 55 weight 56 to bow the web 195 into a concave arc 260 away from the rail structure 70 first outer surface 115 that results in the upper 185 and lower 190 legs that terminate in the upper 200 and lower 205 returns respectively having force 265 to be moved closer to one another, resulting in a tighter grip of the upper 185 and 190 lower legs and respective returns 200, 205 upon the rail structure 70 primary 90 and secondary 95 margins portions to better resist a heavy 56 article 55 from dislodging the support arm extension 155 from the rail structure 70, see FIGS. 6 to 8.

An ongoing option for the article support system 50, is wherein the finger extension portion 230 tapered 234 channel 231 has a higher bending stiffness originating from the lower return 205 at the full width taper 234 that gradually reduces toward the support arm extension 155 distal end portion 165 at the reduced width taper 234, such that the web 195 material bending stiffness is less than the tapered 234 channel 231 stiffness to better operationally control that the second distance 270 second moment 275 from the second moment arm 280 translates through the finger extension portion 230 with minimal deflection moving toward the web 195 with maximum deflection to form the convex web arc 300, see FIGS. 7 and 8.

Alternatively for the article support system 50, is wherein the flexible support arm extension 155 having a proximal end portion 160 and an opposing distal end portion 165 is constructed of a tubular section 157 with a tubular axis 171 spanning therebetween, the distal end portion 165 is adapted 175 to removably engage the article 55, the proximal end portion 160 is structurally substantially formed as a tubular 157 box channel 181 having a tubular upper leg 186, a tubular lower leg 191, and a tubular web 196 disposed therebetween, each of the tubular upper 186 and lower legs 191 terminating in a tubular upper return 201 and a tubular lower return 206 respectively such that the tubular upper return 201, tubular upper leg 186, tubular web 196, tubular lower leg 191, and tubular lower return 206 substantially form a scarfed out "C" shape 210 in cross section that is scarfed out of a portion of the tubular section 157 resulting in a high bending stiffness of the upper 186 and lower 191 tubular legs along the tubular axis 171 and a lower bending stiffness in the tubular web 196 along the tubular axis 171. Wherein operationally, to removably engage the support arm extension 155 to the rail structure 70, the tubular upper leg 186 and the tubular upper return 201 are manually placed about the primary margin portion 90 and the tubular lower leg 191 and the tubular lower return 206 are manually pushed over the secondary margin portion 95 through flexure of the tubular web 196, much the same as shown in FIGS. 4 and 5, in conjunction with the tubular upper 186 and tubular lower 191 legs to position the substantially "C" shape 210 about the rail structure 70 primary 90 and secondary 95 margin portions and the first outer surface portion 115 then manually relaxing the tubular upper 186 and tubular lower 191 legs and the tubular web 196 that results in the tubular upper 186 and tubular lower 191 legs, the tubular upper 200 and tubular lower 205 returns, and the tubular web 196 to adjacently grip the rail structure 70 primary 90 and secondary 95 margin portions and the first outer surface portion 115 to secure the support arm extension 155 to the rail structure 70 via locking the support arm extension 155 in movement along the longitudinal 85, longwise 100, shortwise 125, and arm 170 axes relative to the rail structure 70, see in particular FIGS. 9 and 10.

CONCLUSION

Accordingly, the present invention of the article support system has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. An article support system that is adapted to support an article upon and relative to a surface, wherein the article is suspended above a floor surface, comprising:
    (a) a substantially rigid rail structure that includes a rail first end portion and an opposing rail second end portion with a longitudinal axis spanning therebetween, further said rail structure has a primary margin portion and an opposing secondary margin portion with a longwise axis spanning therebetween, wherein said primary and secondary margin portions are about said longitudinal axis, in addition said rail structure includes a first outer surface portion and an opposing second outer surface portion, with a shortwise axis spanning therebetween, wherein said first and second outer surface portions are about said longitudinal axis, wherein said second outer surface is adapted to affix to the surface, wherein said primary and secondary margins are structurally formed as a convex semi-circular radius surface that has a tangent interface with each of said first and second outer surface portions, said longitudinal, longwise, and short wise axes are all perpendicular to one another; and (b) a flexible support arm extension having a proximal end portion and an opposing distal end portion with an arm axis spanning therebetween, said distal end portion is adapted to removably engage the article, said proximal end portion is structurally substantially formed as a box channel having an upper leg, a lower leg, and a web disposed therebetween, each of said upper and lower legs terminating in an upper and lower return respectively such that said upper return, upper leg, web, lower leg, and lower return substantially form a "C" shape in cross section, wherein said support arm extension distal end portion that is adapted to removably engage the article, is constructed of a finger extension portion extending downward from said web and said lower leg in a cantilever manner along said arm axis, wherein said finger extension portion is constructed of a tapered channel that includes a channel web with a pair of opposing channel legs, wherein said channel legs taper from said a full width taper at said lower return to a reduced width taper with at said support arm extension distal end portion, wherein said finger extension portion terminates in an open "J" hook that is positioned opposite of said upper and lower legs relative to said web and said arm axis, wherein said open "J" hook has a center of gravity from a weight of the article that is a first distance from said arm axis, wherein said first distance forms a first moment from a first moment arm from the article weight to bow said web into a concave arc away from said rail structure first outer surface that results in said upper and lower legs that terminate in said upper and lower returns respectively having force to be moved closer to one another, resulting in a tighter grip of said upper and lower legs and respective returns upon said rail structure primary and secondary margins portions to better resist a heavy article from dislodging said support arm extension from said rail structure.

2. An article support system according to claim 1 wherein said support arm extension distal end portion that is adapted to removably engage the article, is constructed of a finger extension portion extending downward from said web and said lower leg in a cantilever manner along said arm axis, wherein said finger extension portion terminates in an open "J" hook that is positioned opposite of said upper and lower legs relative to said web and said arm axis, wherein said open "J" hook has a center of gravity from a weight of the article that is a first distance from said arm axis, wherein said first distance forms a first moment from a first moment arm from the article weight to bow said web into a concave arc away from said rail structure first outer surface that results in said upper and lower legs that terminate in said upper and lower returns respectively having force to be moved closer to one another, resulting in a tighter grip of said upper and lower legs and respective returns upon said rail structure primary and secondary margins portions to better resist a heavy article from dislodging said support arm extension from said rail structure.

3. An article support system according to claim 2 wherein said finger extension portion material has a higher bending stiffness that said web material bending stiffness to better operationally control that said first distance first moment from said first moment arm translates through said finger extension portion with minimal deflection moving toward said web with maximum deflection to form said concave web arc.

4. An article support system according to claim 1 wherein said support arm extension distal end portion that is adapted to removably engage the article, is constructed of a finger extension portion extending downward from said web and said lower leg in a cantilever manner along said arm axis, wherein said finger extension portion terminates in an open "J" hook that is positioned a second distance from said web and lower leg, wherein said second distance is along said arm axis, wherein said second distance forms a second moment from a second moment arm from a manual grasping of said open "J" hook and manually pulling said open "J" hook away from said web and said first outer surface in a movement parallel to said shortwise axis, wherein said second moment from said second moment arm to bow said web into a convex arc away from said rail structure first outer surface that results in said lower leg and lower returns to be moved further from said secondary margin portion resulting in a looser grip creating a gap of said lower leg and lower return relative to said rail structure secondary margin portion to better allow dislodging of said support arm extension from said rail structure.

5. An article support system according to claim 4 wherein said finger extension portion material has a higher bending stiffness that said web material bending stiffness to better operationally control that said second distance second moment from said second moment arm translates through said finger extension portion with minimal deflection moving toward said web with maximum deflection to form said convex web arc.

6. An article support system according to claim 1 wherein said finger extension portion tapered channel has a higher bending stiffness originating from said lower return at said full width taper that gradually reduces toward said support arm extension distal end portion at said reduced width taper, such that said web material bending stiffness is less than said tapered channel bending stiffness to better operationally control that said second distance second moment from said second moment arm translates through said finger extension portion with minimal deflection moving toward said web with maximum deflection to form said convex web arc.

7. An article support system according to claim 1 wherein said flexible support arm extension having a proximal end portion and an opposing distal end portion is constructed of a tubular section with a tubular axis spanning therebetween, said distal end portion is adapted to removably engage the article, said proximal end portion is structurally substantially formed as a tubular box channel having a tubular upper leg, a tubular lower leg, and a tubular web disposed therebetween, each of said tubular upper and lower legs terminating in a tubular upper return and a tubular lower return respectively such that said tubular upper return, tubular upper leg, tubular web, tubular lower leg, and tubular lower return substantially form a scarfed out "C" shape in cross section that is scarfed out of a portion of said tubular section resulting in a high bending stiffness of said upper and lower tubular legs along said tubular axis and a lower bending stiffness in said tubular web along said tubular axis.

* * * * *